US009331393B2

(12) United States Patent
Liu et al.

(10) Patent No.: US 9,331,393 B2
(45) Date of Patent: May 3, 2016

(54) FRONT FEED SATELLITE TELEVISION ANTENNA AND SATELLITE TELEVISION RECEIVER SYSTEM THEREOF

(75) Inventors: Ruopeng Liu, Shenzhen (CN); Chunlin Ji, Shenzhen (CN); Yutao Yue, Shenzhen (CN); Jinjin Wang, Shenzhen (CN); Yunnan Hong, Shenzhen (CN)

(73) Assignee: KUANG-CHI INNOVATIVE TECHNOLOGY LTD., Shenzhen (CN)

( * ) Notice: Subject to any disclaimer, the term of this patent is extended or adjusted under 35 U.S.C. 154(b) by 162 days.

(21) Appl. No.: 14/235,057

(22) PCT Filed: Nov. 18, 2011

(86) PCT No.: PCT/CN2011/082443
§ 371 (c)(1),
(2), (4) Date: Jan. 25, 2014

(87) PCT Pub. No.: WO2013/013458
PCT Pub. Date: Jan. 31, 2013

(65) Prior Publication Data
US 2015/0270623 A1    Sep. 24, 2015

(30) Foreign Application Priority Data

Jul. 26, 2011  (CN) ........................ 2011 1 0210218
Jul. 26, 2011  (CN) ........................ 2011 1 0210273
Aug. 23, 2011 (CN) ........................ 2011 1 0242625
Aug. 23, 2011 (CN) ........................ 2011 1 0242627

(51) Int. Cl.
*H01Q 19/06*    (2006.01)
*H01Q 15/00*    (2006.01)
(Continued)

(52) U.S. Cl.
CPC ....... *H01Q 15/0086* (2013.01); *H01Q 15/0026* (2013.01); *H01Q 15/10* (2013.01);
(Continued)

(58) Field of Classification Search
CPC ... H01Q 15/0086; H01Q 15/23; H01Q 19/06; H01Q 15/14
USPC .................. 343/755, 843, 757, 872
See application file for complete search history.

(56) References Cited

U.S. PATENT DOCUMENTS

| 4,905,014 A | * | 2/1990 | Gonzalez | ................ H01Q 3/46 343/700 MS |
| 7,570,432 B1 | * | 8/2009 | Yonak | .................. G02B 3/0087 359/652 |

(Continued)

FOREIGN PATENT DOCUMENTS

| CN | 101587990 A | 11/2009 |
| CN | 101699659 A | 4/2010 |

(Continued)

OTHER PUBLICATIONS

Wei Xiang Jiang et al: "Planar reflector antenna design based on gradient-index metamaterials", Microwave and Millimeter Wave Technology (ICMMT), 2010 International Conference on, IEEE, Piscataway, NJ, USA, May 8, 2010, pp. 431-433,XP031717221,ISBN: 978-1-4244-5705-2.

(Continued)

*Primary Examiner* — Jean B Jeanglaude
(74) *Attorney, Agent, or Firm* — Perkins Coie LLP

(57) ABSTRACT

A front feed satellite television antenna includes a metamaterial panel. The metamaterial panel includes a core layer and a reflective panel. The core layer includes a core layer lamella which further includes a circular area and multiple annular areas distributed around the circular area. Within the circular area and the annular areas, refractive indexes are identical at a same radius, and within the respective areas, the refractive indexes decrease gradually as radius increases. The minimum refractive index of the circular area is less than the maximum the refractive index of the annular area adjacent thereto. For two adjacent annular areas, the minimum refractive index of the annular area at the inner side is less than the maximum refractive indexes of the annular area at the outer side. The metamaterial panel can replace conventional parabolic antenna, thus facilitating manufacturing and processing, and further reducing costs.

13 Claims, 14 Drawing Sheets

(51) Int. Cl.
*H01Q 15/14* (2006.01)
*H01Q 15/10* (2006.01)
*H01Q 15/23* (2006.01)
*H01Q 19/10* (2006.01)
*G02B 1/118* (2015.01)

(52) U.S. Cl.
CPC .............. *H01Q 15/14* (2013.01); *H01Q 15/23* (2013.01); *H01Q 19/06* (2013.01); *H01Q 19/065* (2013.01); *G02B 1/118* (2013.01); *H01Q 19/104* (2013.01)

(56) References Cited

U.S. PATENT DOCUMENTS

| 2008/0055185 | A1* | 3/2008 | Hogsett | 343/872 |
| 2008/0238790 | A1 | 10/2008 | McGrath et al. | |
| 2009/0146900 | A1* | 6/2009 | Schneider et al. | 343/834 |
| 2011/0037671 | A1* | 2/2011 | Vogler | 343/757 |
| 2011/0095953 | A1 | 4/2011 | Lier | |

FOREIGN PATENT DOCUMENTS

| CN | 201450116 U | 5/2010 |
| CN | 101867094 A | 10/2010 |
| EP | 1976062 A1 | 10/2008 |

OTHER PUBLICATIONS

Hueso Gonzalez, J European Search Report, EP Application No. 11870155.6, Apr. 22, 2015.

* cited by examiner

FRONT FEED SATELLITE TELEVISION ANTENNA AND SATELLITE TELEVISION RECEIVER SYSTEM THEREOF

TECHNICAL FIELD

The present invention relates to the field of communications, and in particular, to a front-feed satellite television antenna and a satellite television receiving system thereof.

BACKGROUND

A conventional satellite television receiving system is a satellite ground receiving station consisting of a paraboloid antenna, a feed source, a low noise block, and a satellite receiver. The paraboloid antenna is responsible for reflecting satellite signals to the feed source and the low noise block which are located at a focal point. The feed source is a horn arranged at the focal point of the paraboloid antenna and is used to collect satellite signals. The feed source is also called a corrugated horn. The feed source has two main functions: first, collecting electromagnetic wave signals received by the antenna, converting the collected signals into a signal voltage and supplying the voltage to the low noise block; and second, performing polarization conversion for the received electromagnetic wave. The low noise block LNB (also called a frequency de-multiplier) is used to perform frequency de-multiplication for the satellite signals from the feed source, amplify the signals, and transmit the amplified signals to the satellite receiver. Generally, the LNB includes an LNB of a C wave band frequency (3.7 GHz to 4.2 GHz, 18 to 21 V) and an LNB of a Ku wave band frequency (10.7 GHz to 12.75 GHz, 12 to 14 V). The working flow of the LNB is firstly amplifying the satellite high frequency signals by a hundred thousand times, and then using a local oscillating circuit to convert the high frequency signals into signals at a medium frequency of 950 MHz to 2050 MHz, to facilitate signal transmission on a coaxial cable and signal demodulation and operation of the satellite receiver. The satellite receiver is used to demodulate the satellite signals transmitted from the low noise block. Satellite television images or digital signals and accompanying sound signals are acquired by modulation.

When the satellite signals are being received, the parallel electromagnetic waves are converged onto the feed source after reflection by the paraboloid antenna. Generally, the feed source corresponding to the paraboloid antenna is a horn antenna.

However, since a curved face of a reflective surface of the paraboloid antenna is difficult in machining and high in accuracy requirement, the paraboloid antenna is hard to be manufactured and high in cost.

SUMMARY OF THE INVENTION

In view of the defects that the existing satellite television antenna is difficult in machining and high in cost, a technical problem to be solved in the present invention is to provide a front-feed satellite television antenna, which is easy in machining and low in manufacturing cost.

A technical solution employed by the present invention to solve the technical problem thereof is to provide a front-feed satellite television antenna, wherein the front-feed satellite television antenna comprises a metamaterial panel arranged behind a feed source; the metamaterial panel comprising a core layer and a reflective plate arranged at a lateral surface of the core layer; the core layer comprising at least one core layer sheet; the core layer sheet comprising a sheet-like substrate and a plurality of artificial microstructures or holes arranged on the substrate; based on refractive index distribution, the core layer sheet being divided into a circular area in a middle position and a plurality of annular areas, which are distributed around the circular area and share a circle center with the circular area; refractive indices at a same radius in the circular area and annular areas being the same, and refractive indices in respective areas of the circular area and annular areas gradually decreasing with the increase of a radius; a maximum refractive index value in the circular area being smaller than a maximum refractive index value in the adjacent annular area; and with respect to two adjacent annular areas, a minimum refractive index value in an annular area on the inner side being smaller than a maximum refractive index value in an annular area on the outer side.

Further, the core layer sheet further comprises a fill layer coating the artificial microstructures.

Further, the core layer comprises a plurality of parallel core layer sheets with same refractive index distribution.

Further, the metamaterial panel further comprises a matching layer arranged on the other side of the core layer, to match refractive indices from air to the core layer.

Further, the circle center is a center of the core layer sheet, refractive index variation ranges of the circular area and the plurality of annular areas are the same, and distribution of a refractive index n(r) of the core layer sheet meets the following formula:

$$n(r) = n_{max} - \frac{\sqrt{l^2 + r^2} - l - k\lambda}{2d};$$

wherein n(r) represents a refractive index value at a radius r on the core layer sheet;

l is a distance from the feed source to the matching layer close to the feed source, or l is a distance from the feed source to the core layer;

d is a thickness of the core layer, and $$d = \frac{\lambda}{2(n_{max} - n_{min})};$$

$n_{max}$ represents a maximum refractive index value of the core layer sheet;

$n_{min}$ represents a minimum refractive index value of the core layer sheet; and $$k = \text{floor}\left(\frac{\sqrt{l^2 + r^2} - l}{\lambda}\right),$$

wherein floor represents rounding down to an integer.

Further, the matching layer comprises a plurality of matching layer sheets, and each matching layer sheet has a single refractive index. All refractive indices of the plurality of matching layer sheets of the matching layer satisfy the following formula:

$$n(i) = ((n_{max} + n_{min})/2)^{\frac{i}{m}};$$

wherein m represents the total number of matching layers, and i represents a serial number of the matching layer sheet, wherein a serial number of the matching layer sheet close to the core layer is m.

Further, each of the matching layer sheets comprises a first substrate and a second substrate of the same material, and air is filled between the first substrate and the second substrate.

Further, a plurality of artificial microstructures of each core layer sheet of the core layer are same in shape, a plurality of artificial microstructures at the same radius in the circular area and the annular areas have same geometrical sizes, and geometrical sizes of the artificial microstructures in respective areas of the circular area and annular areas gradually decrease with the increase of the radius; geometrical sizes of the artificial microstructure with minimum geometrical sizes in the circular area are smaller than geometrical sizes of the artificial microstructure with maximum geometrical sizes in the adjacent annular area; and with respect to two adjacent annular areas, geometrical sizes of the artificial microstructure with minimum geometrical sizes in an annular area on the inner side are smaller than geometrical sizes of the artificial microstructure with maximum geometrical sizes in an annular area on the outer side.

Further, a plurality of artificial holes of each core layer sheet of the core layer are same in shape, and the plurality of artificial holes are filled with a medium with a refractive index larger than that of the substrate; a plurality of artificial holes at the same radius in the circular area and the annular areas have the same volume, and volumes of the artificial holes in respective areas of the circular area and annular areas gradually decrease with the increase of the radius; a volume of the artificial hole with the minimum volume in the circular area is smaller than a volume of the artificial hole with the maximum volume in the adjacent annular area; and with respect to two adjacent annular areas, a volume of the artificial hole with the minimum volume in an annular area on the inner side is smaller than a volume of the artificial hole with the maximum volume in an annular area on the outer side.

Further, a plurality of artificial holes of each core layer sheet of the core layer are same in shape, and the plurality of artificial holes are filled with a medium with a refractive index smaller than that of the substrate; a plurality of artificial holes at the same radius in the circular area and the annular areas have the same volume, and volumes of the artificial holes in respective areas of the circular area and annular areas gradually increase with the increase of the radius; a volume of the artificial hole with the maximum volume in the circular area is larger than a volume of the artificial hole with the minimum volume in the adjacent annular area; and with respect to two adjacent annular areas, a volume of the artificial hole with the maximum volume in an annular area on the inner side is larger than a volume of the artificial hole with the minimum volume in an annular area on the outer side.

Further, the artificial microstructure is a metal microstructure in a shape of planar snowflake.

Further, the artificial hole is cylindrical.

Further, a diverging element, which is arranged behind the feed source and has an electromagnetic wave diverging function, is further comprised, and the metamaterial panel is arranged behind the diverging element. The diverging element is a concave lens or a diverging metamaterial panel. The diverging metamaterial panel comprises at least one diverging sheet; refractive indices of the diverging sheet are distributed in a form of circle with a circle center of a center of the diverging sheet, refractive indices at the same radius are the same, and refractive indices gradually decrease with the increase of the radius.

Based on the front-feed satellite television antenna according to the present invention, the conventional paraboloid antenna is replaced by the sheet-like metamaterial panel, and therefore, manufacture is simpler, and cost is lower.

The present invention further provides a satellite television receiving system, which comprises a feed source, a low noise block, and a satellite receiver. The satellite television receiving system further comprises the foresaid front-feed satellite television antenna, and the front-feed satellite television antenna is arranged behind the feed source.

BRIEF DESCRIPTION OF THE DRAWINGS

To illustrate the technical solutions in embodiments of the present invention more clearly, the attached drawings necessary for description of the embodiments will be introduced briefly herein below. Obviously, these attached drawings only illustrate some exemplary embodiments of the present invention, and persons of ordinary skill in the art may further derive other drawings according to these attached drawings without making inventive efforts. Among the attached drawings.

DETAILED DESCRIPTION

Figure 1:
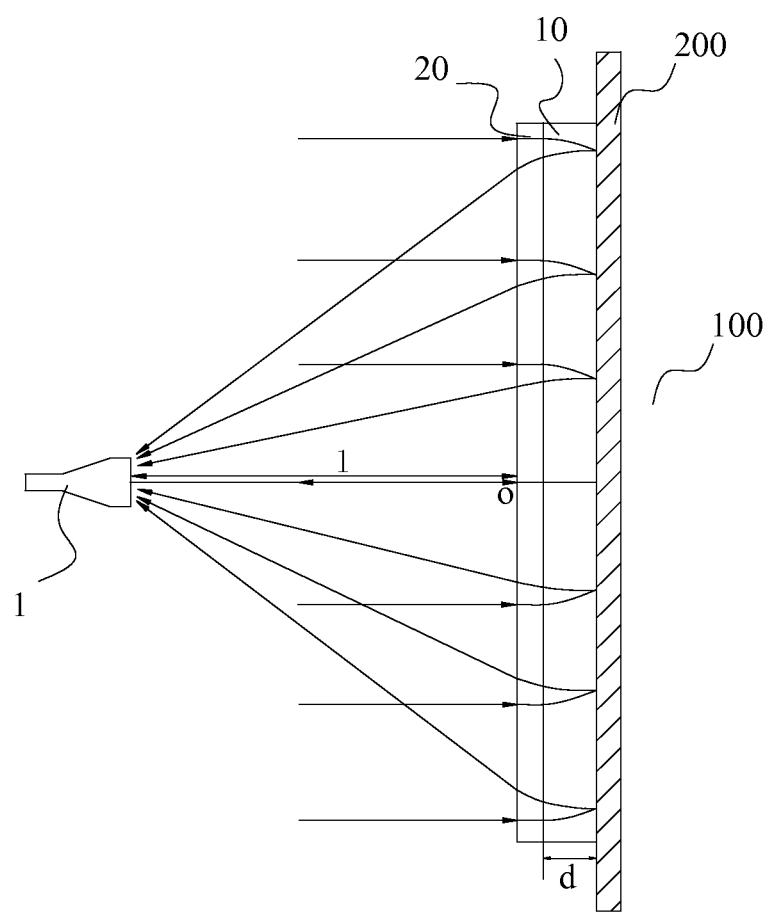
FIG. 1 is a schematic structural view of a front-feed satellite television antenna according to a first embodiment of the present invention.

The specific contents of the present invention will be described in detail with reference to the attached drawings.

As shown in FIG. 1 to FIG. 7, a front-feed satellite television antenna according to a first embodiment of the present invention comprises a metamaterial panel 100 arranged behind a feed source 1. The metamaterial panel 100 comprises a core layer 10 and a reflective plate 200 arranged at a surface of the core layer 10. The core layer 10 comprises at least one core layer sheet 11. The core layer sheet comprises a sheet-like substrate 13 and a plurality of artificial microstructures 12 (referring to FIG. 2a) arranged on the substrate 13. Based on refractive index distribution, the core layer sheet 11 may be divided into a circular area Y in a middle position and a plurality of annular areas (marked as H1, H2, H3, H4, H5 in the figure), which are distributed around the circular area Y and share a circle center with the circular area. Refractive indices at the same radius in the circular area Y and annular areas are the same, and refractive indices in respective areas of the circular area and annular areas gradually decrease with the increase of a radius. A minimum refractive index value in the circular area is smaller than a maximum refractive index value in the adjacent annular area. With respect to two adjacent annular areas, a minimum refractive index value in an annular area on the inner side is smaller than a maximum refractive index value in an annular area on the outer side. In order to describe the present invention in a better way, the core layer sheet 11 is divided into the circular area and the plurality of annular areas based on the refractive indices, but it does not mean that the core layer sheet 11 of the present invention has this actual structure. In the present invention, the feed source 1 is arranged on a central axis of the metamaterial panel. That is, a connecting line of the feed source and a center of the core layer sheet 11 coincides with the central axis of the metamaterial panel. Each of the feed source 1 and the metamaterial panel 100 is supported by a bracket, but the brackets are not shown in the figure. The brackets are not the core of the present invention, and instead a conventional supporting manner can be adopted. In addition, the feed source preferably is a horn antenna. The annular areas herein comprise both the complete annular areas in FIG. 3 and incomplete annular areas in FIG. 3. The core layer sheet 11 in the figure is in a shape of square. Certainly, it may also be in another shape, such as cylinder. When it is cylindrical, all the annular areas can be complete annular areas. In addition, there may also be no annular areas H4 and H5 in FIG. 3. In this case, refractive index distribution of the H4 and H5 may be uniform (that is, no artificial microstructures are arranged on H4 and H5). In addition, the reflective plate may be a metal reflective plate having a smooth surface, for example, a smooth copper plate, aluminum plate, or iron plate.

As shown in FIGS. 1-4, the core layer 10 comprises a plurality of parallel core layer sheets 11 with same refractive index distribution. The plurality of core layer sheets 11 fit closely, and a double faced adhesive tape may be used to bond each other, or bolts may be used for fixed connection. In addition, the core layer sheet 11 further comprises a fill layer 15 covering the artificial microstructure 12. The fill layer 15 may be air or a plate of another medium, and preferably be a plate part made of a material the same as that of the substrate 13. Each core layer sheet 11 may be divided into a plurality of same metamaterial units D. Each metamaterial unit D consists of an artificial microstructure 12, a unit substrate V and a unit fill layer W. Each core layer sheet 11 has only one metamaterial unit D in the thickness direction. All the metamaterial units D may be identical blocks, such as cubes or cuboids. Length, width, height of each metamaterial unit D are no greater than ⅕ of a wavelength of an incident electromagnetic wave (usually are ⅒ of the wavelength of the incident electromagnetic wave), so that the entire core layer may have a continuous electric field and/or magnetic field response to the electromagnetic wave. Preferably, the metamaterial unit D is a cube with a side length of ⅒ of the wavelength of the incident electromagnetic wave. Certainly, a thickness of the fill layer is adjustable. A minimum value of the thickness may reach 0. That means no fill layer is needed. In this situation, the substrate and the artificial microstructures form the metamaterial unit. That is to say, a thickness of the metamaterial unit D is equal to a sum of a thickness of the unit substrate V and a thickness of the artificial microstructure. However, in this case, the thickness of the metamaterial unit D also needs to satisfy the requirement of ⅒ of the wavelength. Therefore, in fact, when the thickness of the metamaterial unit D is selected to be ⅒ of the wavelength, the greater the thickness of the unit substrate V, the less a thickness of the unit fill layer W will be. The situation shown in FIG. 2a is optimal. That is, the thickness of the unit substrate V is equal to the thickness of the unit fill layer W, and the material of the unit substrate V is the same as that of the fill layer W.

The artificial microstructure 12 preferably is a metal microstructure, and the metal microstructure is composed of one or more metal wires. The metal wire itself has a certain width and thickness. The metal microstructure of the present invention preferably is a metal microstructure having isotropic electromagnetic parameters, for example, a metal microstructure in a shape of planar snowflake shown in FIG. 2a.

For the artificial microstructure having a planar structure, the isotropy refers to that, for any electromagnetic wave incident at any angle on the two-dimensional plane, electric field responses and magnetic field responses of the above artificial microstructures on the plane are the same. That is, permittivities and magnetic conductivities are equal. For the artificial microstructure having a three-dimensional structure, the isotropy refers to that, for the electromagnetic wave incident at any angle in the three-dimensional space, electric field responses and magnetic field responses of each artificial microstructure in the three-dimensional space are the same. When the artificial microstructure is a 90-degree rotationally symmetric structure, the artificial microstructure has the feature of isotropy.

For the two-dimensional planar structure, the term "90-degree rotational symmetry" refers to that, after rotating 90 degrees on the plane of the structure about a rotation axis, which is perpendicular to the plane of the structure and passes a symcenter, the rotated structure coincides with the original structure. For the three-dimensional structure, if there are three rotation axes, which are perpendicular to each other and share one intersection point (the intersection point is a rotation center), after rotating 90 degrees on any one of the rotation axes, the rotated structure coincides with the original structure, or is symmetric with the original structure about an interface, this structure is a 90-degree rotationally symmetric structure.

Figure 2A:
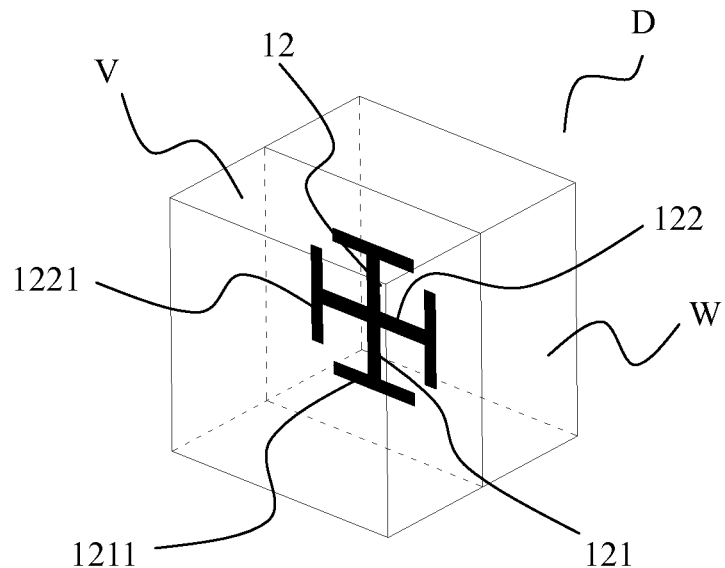
FIGS. 2a-2b are schematic isometric views of metamaterial units of two structures according to the first embodiment of the present invention.

The metal microstructure in a shape of planar snowflake shown in FIG. 2a is a form of an isotropic artificial microstructure. The snowflake-liked metal microstructure has a first metal wire 121 and a second metal wire 122, which are perpendicular to each other and bisect each other. Two first metal branches 1211 with the same length are respectively connected to two ends of the first metal wire 121. The two ends of the first metal wire 121 are respectively connected with midpoints of the two first metal branches 1211. Two second metal branches 1221 with the same length are respectively connected to two ends of the second metal wire 122.

The two ends of the second metal wire 122 are respectively connected with midpoints of the two second metal branches 1221.

It is known that a refractive index $n=\sqrt{\mu\epsilon}$, wherein $\mu$ is a relative magnetic conductivity, $\epsilon$ is a relative permittivity, and $\mu$ and $\epsilon$ are cooperatively referred to as electromagnetic parameters. Experiments prove that, the electromagnetic wave may deflect towards a direction where the refractive index is larger when passing a medium material with non-uniform refractive indices (deflect towards the metamaterial units with larger refractive indices). Therefore, the core layer of the present invention has a converging function for the electromagnetic wave. Electromagnetic waves sent out by the satellite are converged by the core layer for the first time, reflected by the reflective plate, and then converged by the core layer for the second time. Therefore, refractive index distribution of the core layer may be reasonably designed to enable the electromagnetic waves sent out by the satellite to converge onto the feed source after the first convergency, reflection of the reflective plate, and second convergency. In the situation where the material of the substrate and the material of the fill layer are determined, electromagnetic parameter distribution inside the metamaterial may be obtained by designing the shape and geometrical sizes of the artificial microstructures and/or arrangement of the artificial microstructures on the substrate, so that the refractive index of each metamaterial unit is designed. Firstly, the electromagnetic parameter spatial distribution inside the metamaterial (that is, the electromagnetic parameter of each metamaterial unit) is computed according to an effect required by the metamaterial, and the shape and geometrical sizes of the artificial microstructure on each metamaterial unit are selected according to the electromagnetic parameter spatial distribution (a computer stores various artificial microstructure data in advance). Each metamaterial unit may be designed by using the method of exhaustion. For example, an artificial microstructure having a specific shape is selected firstly, the electromagnetic parameter is computed, and the obtained result is compared with what is desired. The process is repeated for several times until the desired electromagnetic parameter is found. If it is found, the designed parameter of the artificial microstructure is selected; and if it is not found, an artificial microstructure having anther shape is used, and the above process is repeated until the desired electromagnetic parameter is found. The above process will not stop if the electromagnetic parameter is still not found. That is to say, the process stops only when the artificial microstructure with the desired electromagnetic parameter is found. Since this process is implemented by the computer, it can be finished fast although it seems complicated.

In the present invention, the metal microstructure is metal wires such as copper wire or silver wire. The metal wire may be attached on the substrate by using the method of etching, electroplating, diamond etching, photoetching, electro-etching, or ion etching. Certainly, a three-dimensional laser processing method may also be adopted.

As shown in FIG. 1, a schematic structural view of a metamaterial panel according to the first embodiment of the present invention is shown. In this embodiment, the metamaterial panel further comprises a matching layer 20 arranged on the other side of the core layer, to match refractive indices from air to the core layer 10. As is known, the larger a difference between the refractive indices of media, the larger the reflection of the electromagnetic wave incident from one medium to the other medium will be. The large reflection means large energy loss, and so the refractive indices need to be matched. It is known that the refractive index $n=\sqrt{\mu\epsilon}$, where $\mu$ is a relative magnetic conductivity, $\epsilon$ is a relative permittivity, and $\mu$ and $\epsilon$ are cooperatively referred to as electromagnetic parameters. As it is known that, the refractive index of air is 1. Therefore, the matching layer in the way that, the refractive index on the side adjacent to air is substantially the same as that of air, and the refractive index on the side adjacent to the core layer is substantially the same as the refractive index of the adjacent core layer sheet. In this way, the refractive indices from air to the core layer are matched, which decreases the reflection. That is, the energy loss may be reduced greatly, and so the electromagnetic wave may be transmitted farther.

Figure 3:
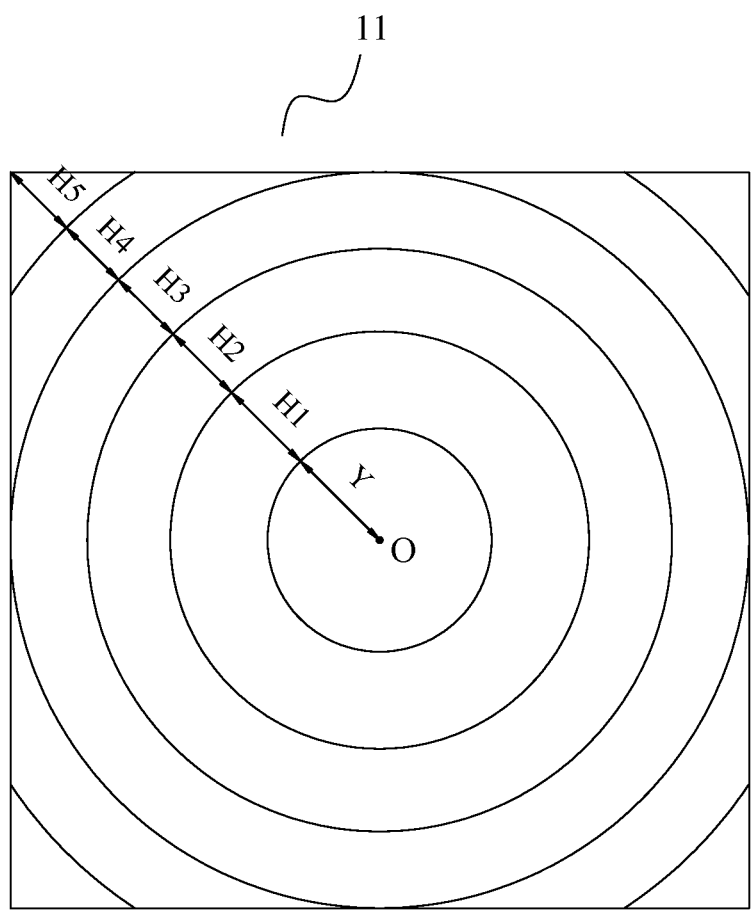
FIG. 3 is a schematic view of refractive index distribution of a core layer sheet according to the first embodiment of the present invention.

In this embodiment, as shown in FIG. 1 and FIG. 3, a circle center of the circular area Y is a center O of the core layer sheet 11, refractive index variation ranges of the circular area Y and the plurality of annular areas are the same, and distribution of a refractive index n(r) of the core layer sheet 11 meets the following formula:

$$n(r) = n_{max} - \frac{\sqrt{l^2 + r^2} - l - k\lambda}{2d}; \quad (1)$$

where n(r) represents a refractive index value at a radius r on the core layer sheet, namely, the refractive index of the metamaterial unit at the radius r on the core layer sheet; the radius herein refers to a distance from a midpoint of each unit substrate V to the center O (circle center) of the core layer sheet, and the midpoint of the unit substrate V herein refers to a midpoint of a surface of the unit substrate V on the same plane of the midpoint O.

l is a distance from the feed source 1 to the matching layer 20 close to the feed source.

d is a thickness of the core layer, and $$d = \frac{\lambda}{2(n_{max} - n_{min})}. \quad (2)$$

$n_{max}$ represents a maximum refractive index value of the core layer sheet 11.

$n_{min}$ represents a minimum refractive index value of the core layer sheet 11. The refractive index variation ranges of the circular area Y and the plurality of annular areas are the same, which means that the refractive indices of each of the circular area Y and the plurality of annular areas continuously decrease from $n_{max}$ to $n_{min}$ in a direction from inside to outside. For example, the value of $n_{max}$ may be 6, and the value of $n_{min}$ may be 1, and the refractive indices of each of the circular area Y and the plurality of annular areas continuously decrease from 6 to 1 in a direction from inside to outside.

$$k = \text{floor}\left(\frac{\sqrt{l^2 + r^2} - l}{\lambda}\right), \quad (3)$$

where floor represents rounding down to an integer; k may be used to represent a serial number of the circular area and the annular areas. k=0 represents the circular area, k=1 represents the first annular area adjacent to the circular area, and k=2 represents the second annular area adjacent to the first annular area, and so on. That is, the maximum value of r determines how many annular areas there are. The thickness of each core layer sheet is a constant value (usually 1/10 of the wavelength of the incident electromagnetic wave). In this way, when the shape of the core layer is determined (may be a cylinder or a square), the size of the core layer sheet can be determined The core layer 10 determined by formula (1), formula (2), and formula (3) may ensure the electromagnetic waves sent out by the satellite to converge to the feed source. This process may be achieved through computer analog simulation or by using the optical principle (that is, calculating by using the equal optical paths).

In this embodiment, the thickness of the core layer sheet 11 is fixed, and usually is less than ⅕ of a wavelength λ of the incident electromagnetic wave, and preferably is ⅒ of the wavelength λ the incident electromagnetic wave. In this way, during design, if the number of core layer sheets 11 is selected, the thickness d of the core layer is determined Therefore, for front-feed satellite television antennas with different frequences (wavelengths are different), it can be known from formula (2) that, a front-feed satellite television antenna of any desired frequency, for example, C wave band and Ku wave band, can be obtained by reasonably designing the values of $(n_{max}-n_{min})$. The frequency range of the C wave band is 3400 MHz-4200 MHz. The frequency range of the Ku wave band is 10.7-12.75 GHz, which may be divided into frequency bands of 10.7-11.7 GHz, 11.7-12.2 GHz, 12.2-12.75 GHz etc.

As shown in FIG. 1, in this embodiment, the matching layer 20 comprises a plurality of matching layer sheets 21, and each matching layer sheet 21 has a single refractive index. All refractive indices of the plurality of matching layer sheets of the matching layer satisfy the following formula:

$$n(i) = ((n_{max} + n_{min})/2)^{\frac{i}{m}};\qquad(4)$$

where m represents the total layer number of the matching layers, and i represents a serial number of the matching layer sheet, wherein a serial number of the matching layer sheet adjacent to the core layer is m. It can be seen from the formula (4) that, setting the matching layers (total layer number m) is directly related to the maximum refractive index $n_{max}$ and the minimum refractive index $n_{min}$ of the core layer. When i=1, n(1) represents the refractive index of the first layer. Since it needs to be substantially equal to the refractive index 1 of air, the total layer number m can be determined as long as $n_{max}$ and $n_{min}$ are determined The matching layer 20 may be made from a plurality of materials which exist in the natural world and each have a single refractive index. The matching layer may also be a matching layer shown in FIG. 7 comprising a plurality of matching layer sheets 21. Each matching layer sheet 21 comprises a first substrate 22 and a second substrate 23 with the same material. Air is filled between the first substrate 22 and the second substrate 23. By controlling a ratio of a volume of air to a volume of the matching layer sheet 21, the refractive index may be varied from 1 (the refractive index of air) to the refractive index of the first substrate, thus the refractive index of each matching layer sheet can be reasonably designed to match refractive indices from air to the core layer.

Figure 4:
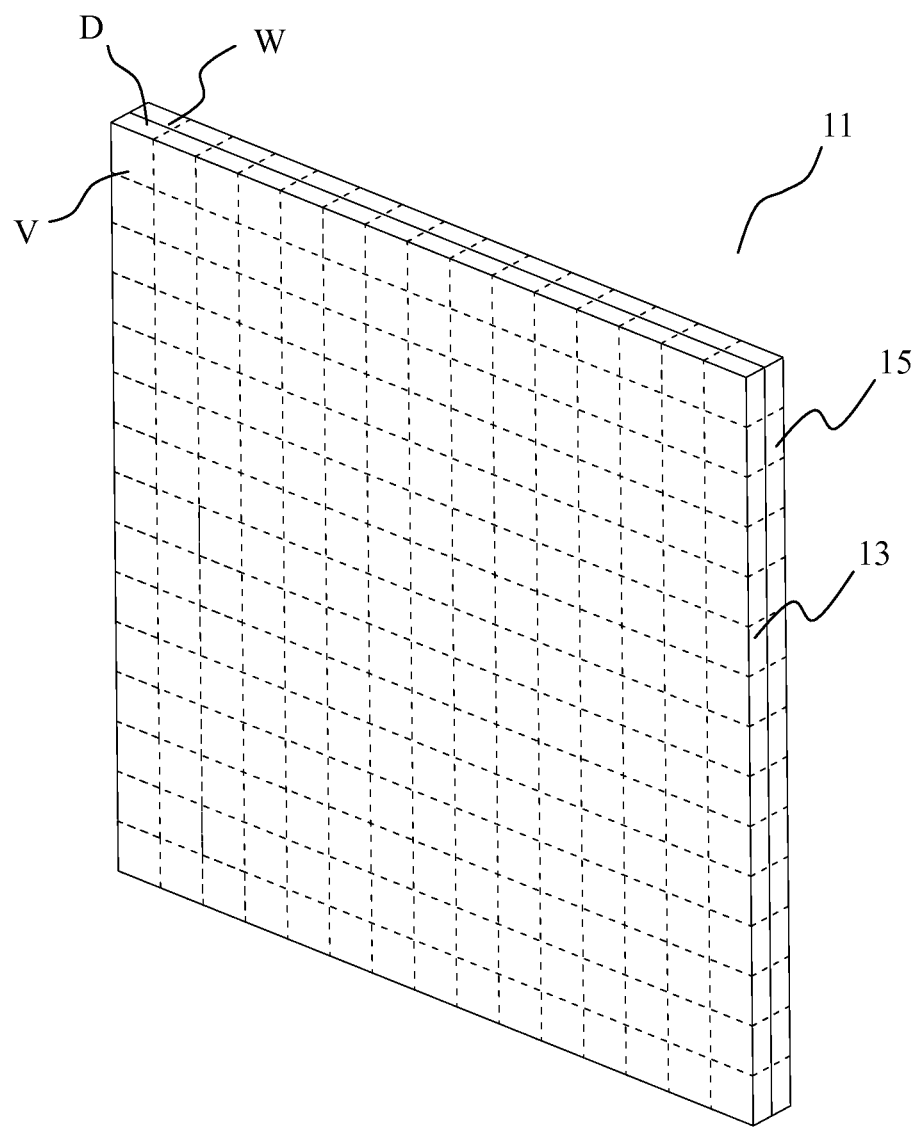
FIG. 4 is a schematic structural view of a form of a core layer sheet according to the first embodiment of the present invention.

FIG. 4 is a form of the core layer sheet 11. A plurality of artificial microstructures 12 of each core layer sheet 11 of the core layer are same in shape, and are all metal microstructures in a shape of planar snowflake. A central point of the metal microstructure coincides with a midpoint of the unit substrate V. A plurality of artificial microstructures at the same radius in the circular area and the annular areas have same geometrical sizes, and geometrical sizes of the artificial microstructures 12 in respective areas of the circular area and annular areas gradually decrease with the increase of the radius. The artificial microstructures with a minimum geometrical size in the circular area are smaller than the artificial microstructures with a maximum geometrical size in the adjacent annular area. With respect to two adjacent annular areas, the artificial microstructures with a minimum geometrical size in an annular area on the inner side are smaller than the artificial microstructure with a maximum geometrical size in an annular area on the outer side. Since the refractive index of each metamaterial unit gradually decreases with the decrease of the sizes of the metal microstructures, the larger the geometrical sizes of the artificial microstructure, the larger the corresponding refractive index will be. Therefore, the refractive indices of the core layer sheet may be distributed according to formula (1) in the way.

Based on different requirements (different electromagnetic waves) and different design requirements, the core layer 10 may comprise the core layer sheet 11 shown in FIG. 4 of different layer numbers.

Figure 2B:
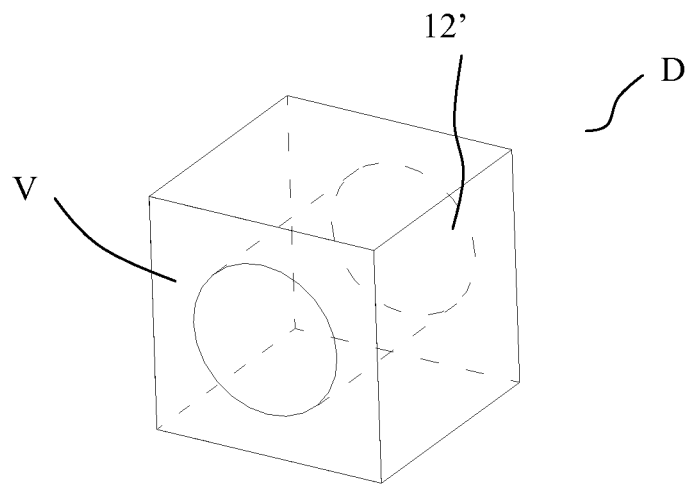

Referring to FIG. 2b, as an alternative structure of the first embodiment of the present invention, the microstructures 12 arranged on the substrate 13 are replaced by a plurality of artificial holes 12'. Based on refractive index distribution, the core layer sheet 11 may be divided into a circular area Y in a middle position and a plurality of annular areas (marked as H1, H2, H3, H4, H5 in the figure), which are distributed around the circular area Y and share a circle center with the circular area. Refractive indices at the same radius in the circular area Y and the annular areas are the same, and refractive indices in respective areas of the circular area and annular areas gradually decrease with the increase of a radius. A minimum refractive index value in the circular area is smaller than a maximum refractive index value in the adjacent annular area. With respect to two adjacent annular areas, a minimum refractive index value in an annular area on the inner side is smaller than a maximum refractive index value in an annular area on the outer side.

The artificial holes 12' may be formed on the substrate in a manner of high-temperature sintering, injection molding, stamping, or numerically controlled punching. Certainly, for the substrates with different materials, the forming manners of the artificial holes 12' may also be different. For example, when the ceramic material is selected as the substrate, the artificial holes 12' are formed on the substrate preferably in a manner of high-temperature sintering. When a polymer material, for example, polytetrafluoroethylene and epoxy resin, is selected as the substrate, the artificial holes 12' are formed on the substrate preferably in the manner of injection molding or stamping.

The artificial hole 12' of the present invention may be one of or a combination of cylindrical hole, conical hole, truncated conical hole, trapezoidal hole, or square hole. Certainly, the artificial hole may also be other shapes. The shape of the artificial hole 12' on each metamaterial unit D may be same or different depending on different requirements. Certainly, for ease of processing and manufacturing, the entire metamaterial preferably adopts holes of the same shape.

Figure 5:
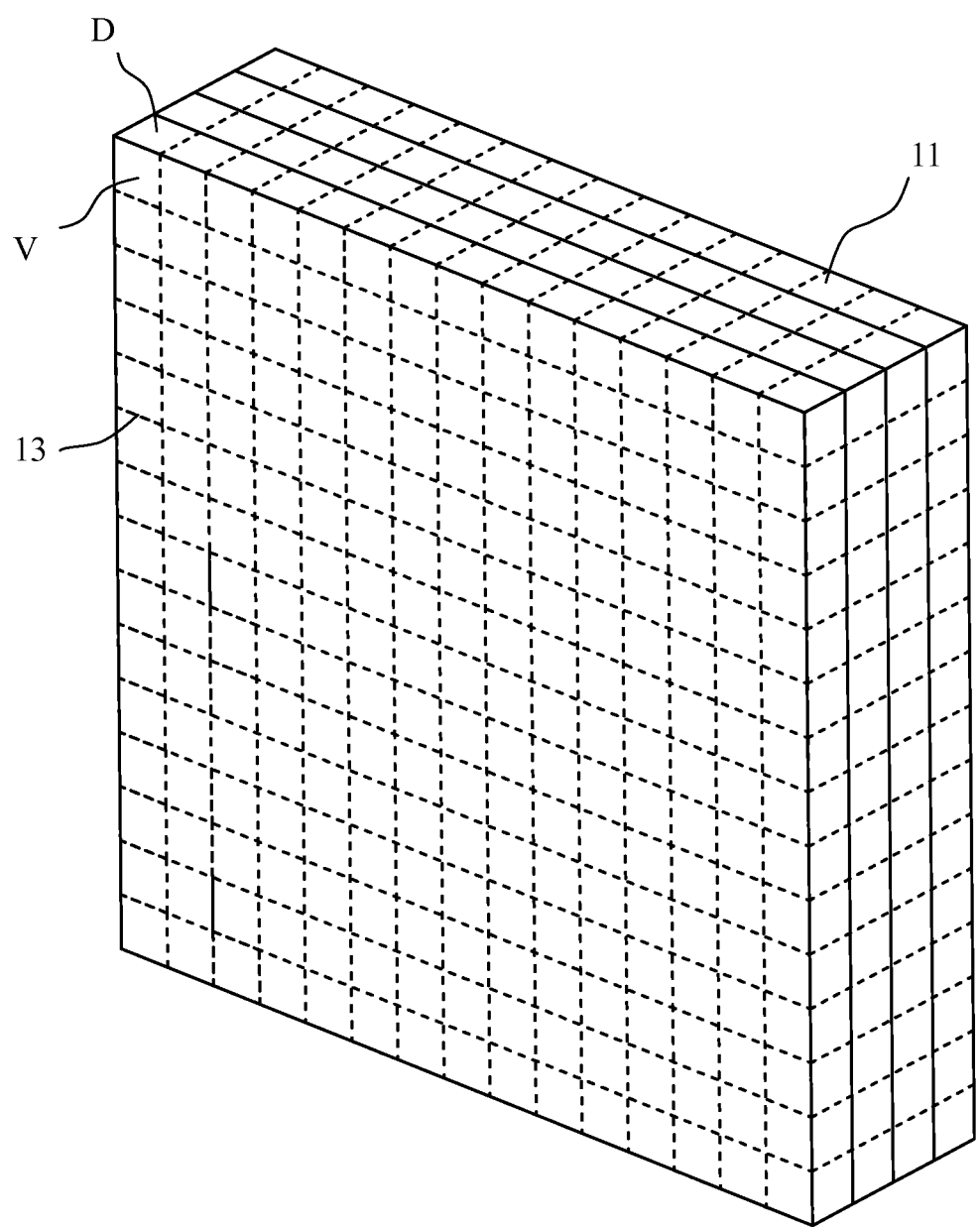
FIG. 5 is a schematic structural view of another form of a core layer according to the first embodiment of the present invention.

Referring to FIG. 5, another core layer structure according to the first embodiment of the present invention is shown. The core layer 10 comprises a plurality of parallel core layer sheets 11 with the same refractive index distribution. The plurality of core layer sheets 11 fit closely, and a double faced adhesive tape may be used to bond each other, or bolts may be used for fixed connection. In addition, an interval may further exist between two adjacent core layer sheets 11, and the interval is filled with air or another medium, to improve the performance of the core layer. The substrate 13 of each core layer sheet 11 may be divided into a plurality of identical substrate units V. Each substrate unit V defines the artificial holes 12'. Each substrate unit V and the corresponding artificial holes 12' form a metamaterial unit D. Each core layer sheet 11 has only one metamaterial unit D in the thickness direction. All the metamaterial units D may be identical blocks, such as cubes or cuboids. A length, a width, a height and a volume of each substrate unit V are no greater than 1/5 of a wavelength of an incident electromagnetic wave (usually are 1/10 of the wavelength of the incident electromagnetic wave), so that the entire core layer may have a continuous electric field and/or magnetic field response to the electromagnetic wave. Preferably, the substrate unit V is a cube with a side length of 1/10 of the wavelength of the incident electromagnetic wave.

It is known that the refractive index $n=\sqrt{\mu\epsilon}$, where $\mu$ is a relative magnetic conductivity, $\epsilon$ is a relative permittivity, and $\mu$ and $\epsilon$ are cooperatively referred to as electromagnetic parameters. Experiments prove that, the electromagnetic wave may deflect towards a direction where the refractive index is larger when passing a medium material with non-uniform refractive indices (deflect towards the metamaterial units with larger refractive indices). Therefore, the core layer of the present invention has a converging function for the electromagnetic wave. Refractive index distribution of the core layer may be reasonably designed to enable the electromagnetic waves sent out by the satellite to converge onto the feed source after passing through the core layer. In the situation where the material of the substrate and the material of the filled medium are determined, electromagnetic parameter distribution inside the metamaterial may be obtained by designing the shape and volume of the artificial holes 12' and/or arrangement of the artificial holes 12' on the substrate, so that the refractive index of each metamaterial unit is designed. Firstly, the electromagnetic parameter spatial distribution inside the metamaterial (that is, the electromagnetic parameter of each metamaterial unit) is computed according to an effect required by the metamaterial, and the shape and volume of the artificial hole 12' on each metamaterial unit are selected according to the electromagnetic parameter spatial distribution (a computer stores various artificial hole data in advance). Each metamaterial unit may be designed by using the method of exhaustion. For example, an artificial hole having a specific shape is selected firstly, the electromagnetic parameter is computed, and the obtained result is compared with what is desired. The process is repeated for several times until the desired electromagnetic parameter is found. If it is found, the designed parameter of the artificial hole 12' is selected; and if it is not found, an artificial hole 12' having anther shape is used, and the above process is repeated until the desired electromagnetic parameter is found. The above process will not stop if the electromagnetic parameter is still not found. That is to say, the process stops only when the artificial hole 12' with the desired electromagnetic parameter is found. Since this process is implemented by the computer, it can be finished fast although it seems complicated.

Figure 6:
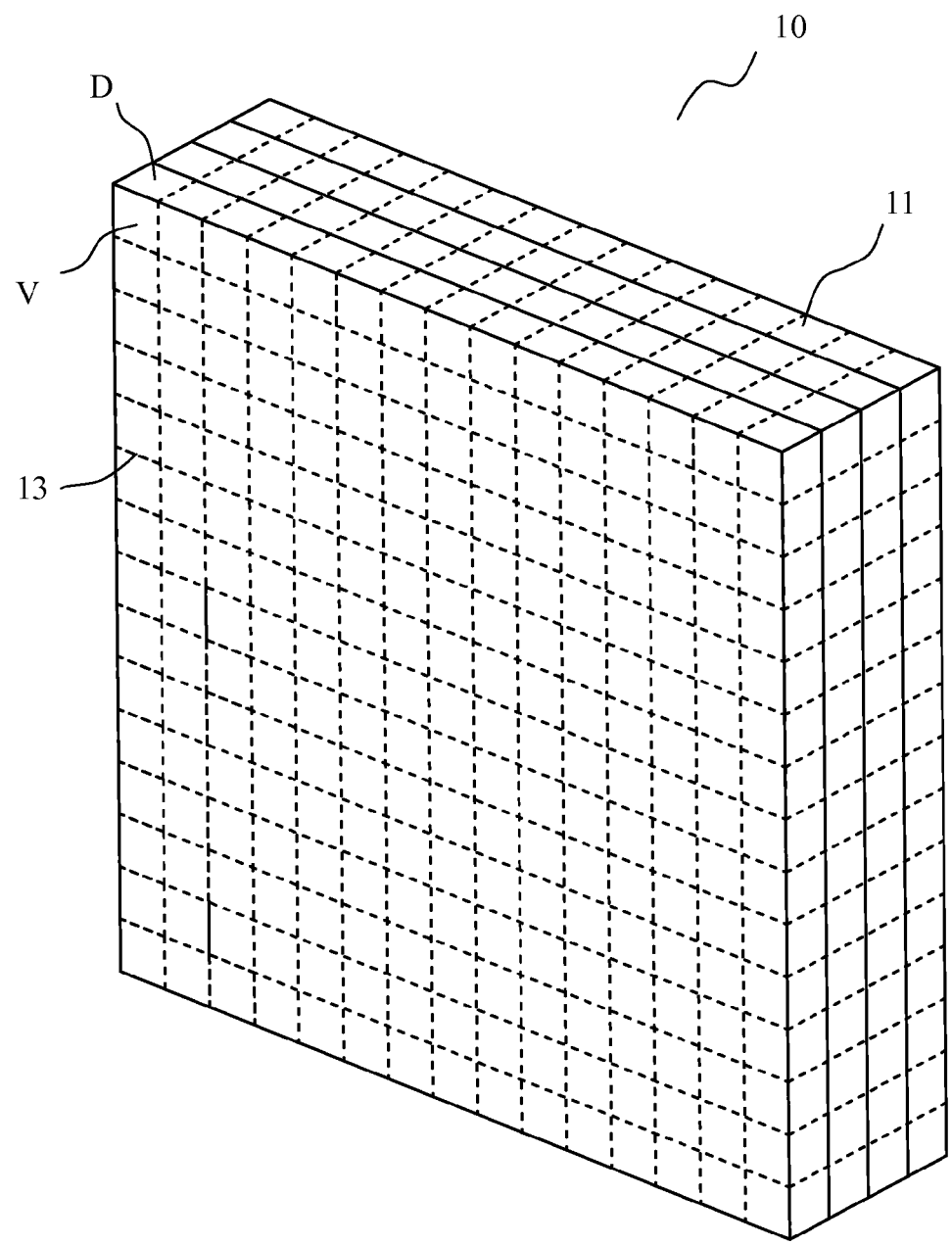
FIG. 6 is a schematic structural view of yet another form of a core layer according to the first embodiment of the present invention.

Referring to FIG. 6, yet another form of the core layer 10 according to the first embodiment of the present invention is shown. A plurality of artificial holes 12' of each core layer sheet 11 of the core layer are the same in shape. The plurality of artificial holes 12' are filled with a medium with a refractive index less than that of the substrate 13. A plurality of artificial holes 12' at the same radius in the circular area and the annular areas have the same volume, and volumes of the artificial holes 12' in respective areas of the circular area and annular areas gradually increase with the increase of the radius. A volume of the artificial hole 12' with the maximum volume in the circular area is greater than a volume of the artificial hole 12' with the minimum volume in the adjacent annular area. With respect to two adjacent annular areas, a volume of the artificial hole 12' with the maximum volume in an annular area on the inner side is greater than a volume of the artificial hole 12' with the minimum volume in an annular area on the outer side. Since the artificial hole 12' is filled with a medium with a refractive index less than that of the substrate, the greater the volume of the artificial hole 12', the more the filled medium will be, and the less the corresponding refractive index will be. Therefore, the refractive indices of the core layer sheet may also be distributed according to formula (1) in the way.

FIG. 5 and FIG. 6 are completely the same in appearance and in refractive index distribution, but the manners for realizing the refractive index distribution are different (the filled mediums are different). The core layer 10 in FIG. 5 and FIG. 6 is in a structure of four layers, which are merely illustrative. Based on different requirements (different incident electromagnetic waves) and different design requirements, different layer numbers may be set.

Certainly, the core layer sheet 11 is not limited to the above two forms. For example, each artificial hole 12' may be divided into several unit holes with the same volume. The same purpose may be achieved by controlling the volume of the artificial hole 12' on each metamaterial unit D by controlling the number of unit holes on each substrate unit V. For another example, the core layer sheet 11 may in the following form that, volumes of all the artificial holes in the same core layer sheet are the same, and refractive indices of the filled medium thereof correspond to formula (1).

Alternatively, in the first embodiment of the present invention, l in the distribution formula of the refractive index n(r) of the core layer sheet 11 represents a distance from the feed source to the core layer (in the first embodiment, l represents a distance from the feed source to the matching layer adjacent to the feed source).

In the first embodiment of the present invention, the substrate of the core layer is made from a ceramic material, a polymer material, a ferroelectric material, a ferrite material, or a ferromagnetic material. The polymer material may be selected from polytetrafluoroethylene, epoxy resin, F4B composite material, and FR-4 composite material. For example, polytetrafluoroethylene will not interfere with the electric field of the electromagnetic waves because of the good electrical insulating property, and has excellent chemical stability and corrosion resistance and a long service life.

Referring to FIGS. 8-14, a front-feed satellite television antenna according to a second embodiment of the present invention is shown. On the basis of the structure in the first embodiment, a diverging element having an electromagnetic wave diverging function is further arranged behind the feed source, and the metamaterial panel is arranged behind the diverging element.

Figure 9:
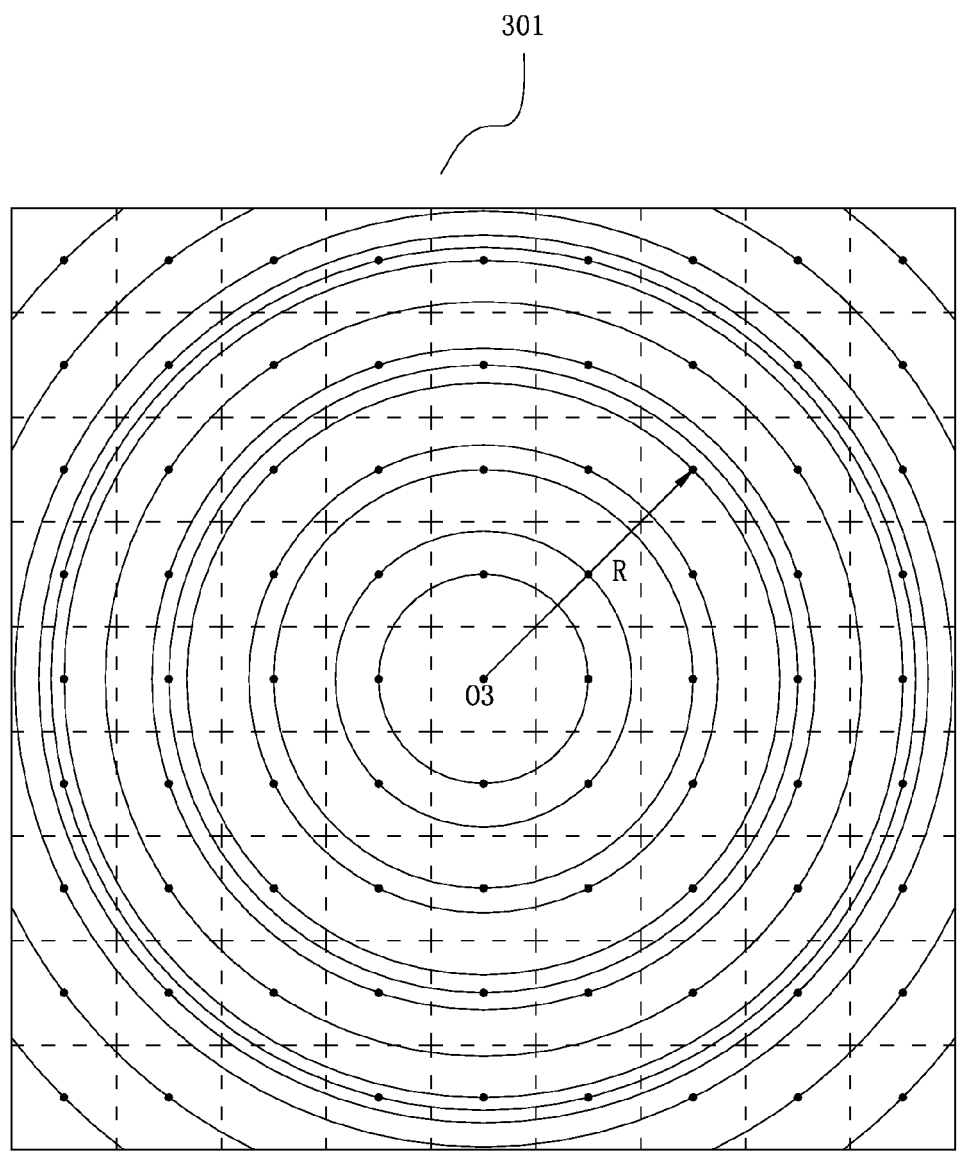
FIG. 9 is a schematic view of refractive index distribution of a diverging sheet according to the second embodiment of the present invention.
Figure 12:
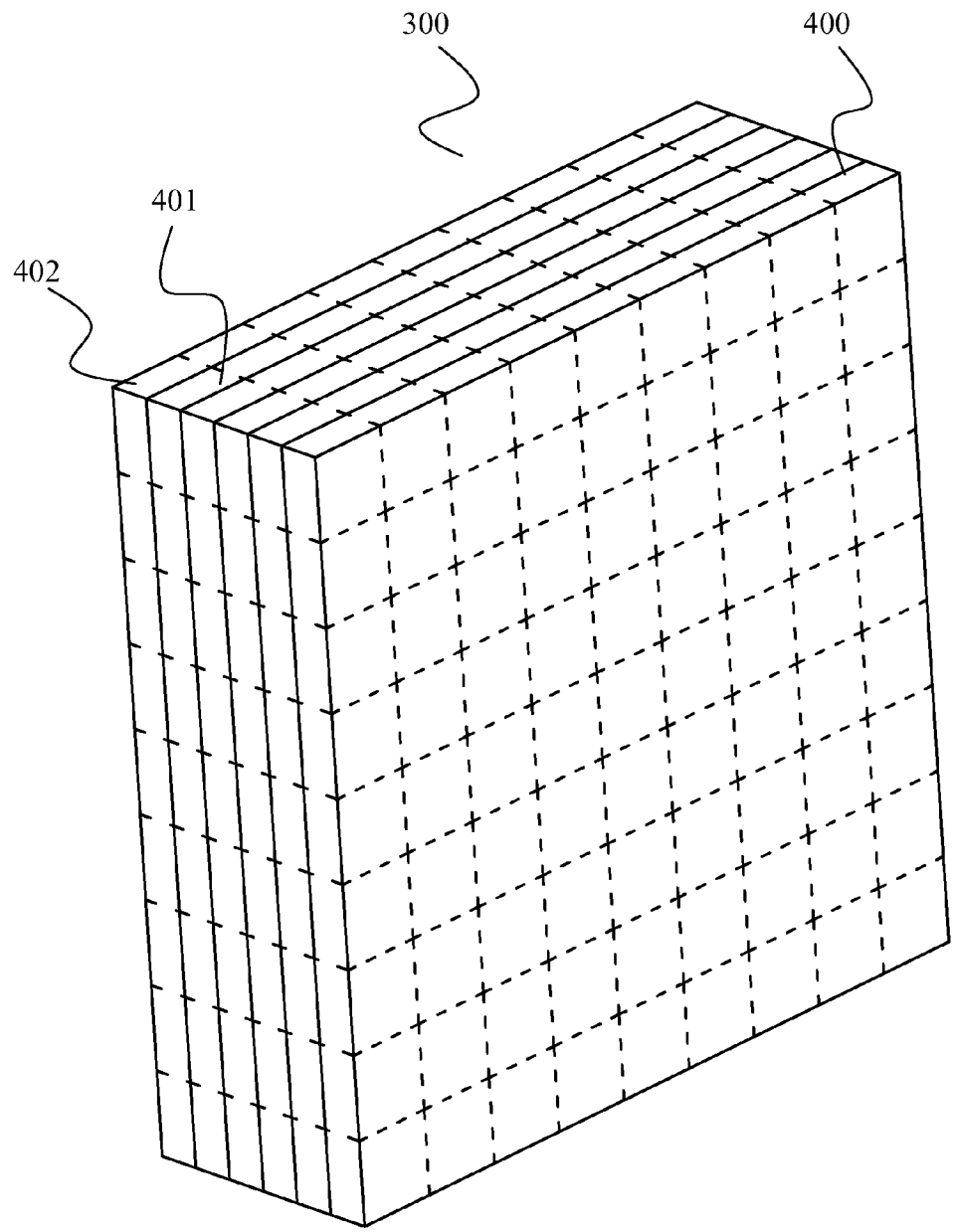
FIG. 12 is a schematic structural view of a diverging metamaterial panel having a plurality of diverging sheets shown in FIG. 10.
Figure 14:
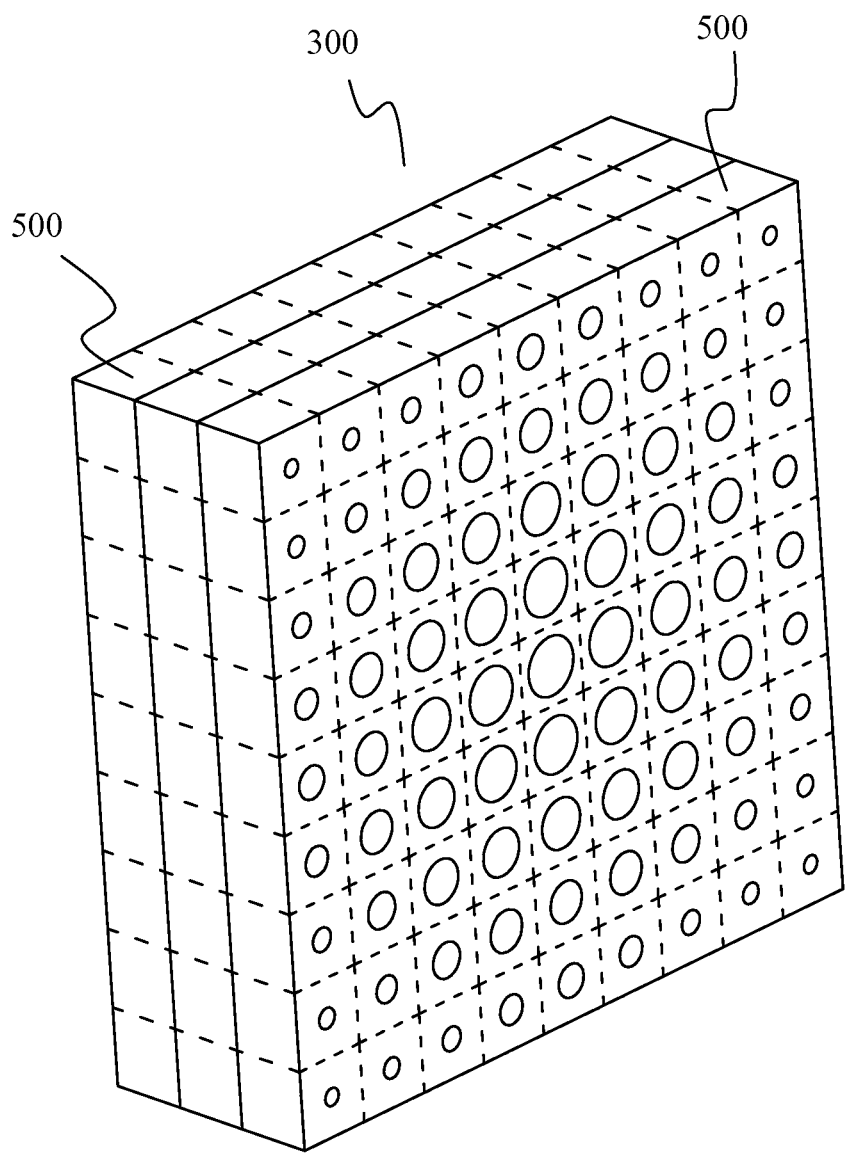
FIG. 14 is a schematic structural view of a diverging metamaterial panel having a plurality of diverging sheets shown in FIG. 13.

The diverging element 200 may be a concave lens or a diverging metamaterial panel 300 shown in FIG. 12 or FIG. 14. The diverging metamaterial panel 300 comprises at least one diverging sheet 301, and refractive indices of the diverging sheet 301 are shown in FIG. 9. The refractive indices of the diverging sheet 301 are distributed in a form of circle with a circle center of a center O3 of the diverging sheet 301. Refractive indices at the same radius are the same. Refractive indices gradually decrease with the increase of the radius. The diverging element having an electromagnetic wave diverging function arranged between the metamaterial panel and the feed source has the following effect: when the feed source receives a specific range of electromagnetic waves (that is, when the metamaterial panel receives a specific range of radiated electromagnetic waves), the distance between the feed source and the metamaterial panel is decreased compared with the situation without the diverging element, so that the volume of the antenna can be reduced significantly.

The refractive index distribution rule on the diverging sheet 301 may be linear, namely, $n_R=n_{min}+KR$, where K is a constant, R is a radius (taking the center O3 of the diverging sheet 301 as the circle center), and $n_{min}$ is a minimum refractive index value on the diverging sheet 301, namely, the refractive index at the center O3 of the diverging sheet 301. In addition, the refractive index distribution rule on the diverging sheet 301 may also be squareratio, namely, $n_R=n_{min}+KR^2$; or cubicratio, namely, $n_R=n_{min}+KR^3$; or power function, namely, $n_R=n_{min}*K^R$.

Figure 10:
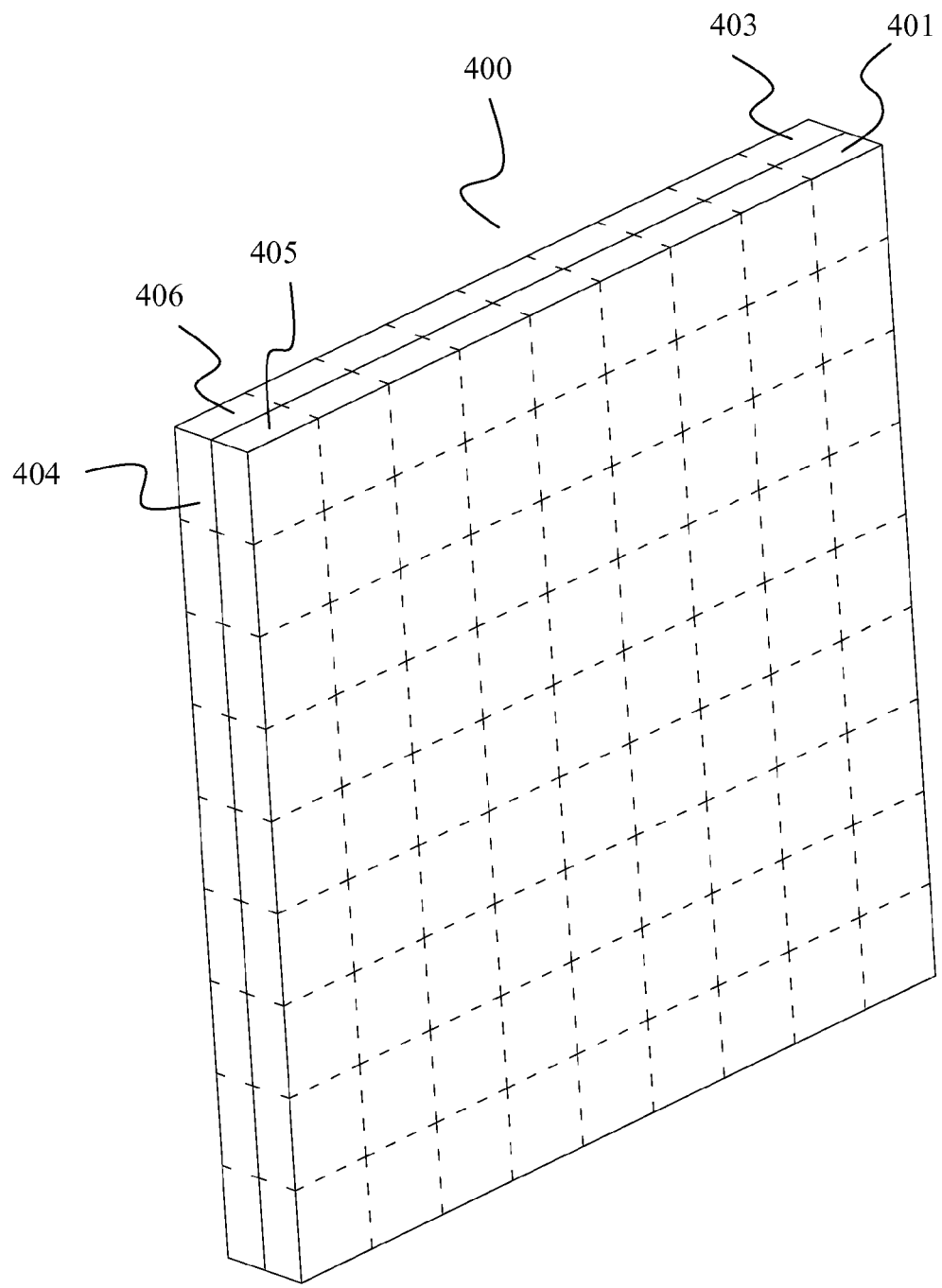
FIG. 10 is a schematic structural view of a form of a diverging sheet according to the second embodiment of the present invention.
Figure 11:
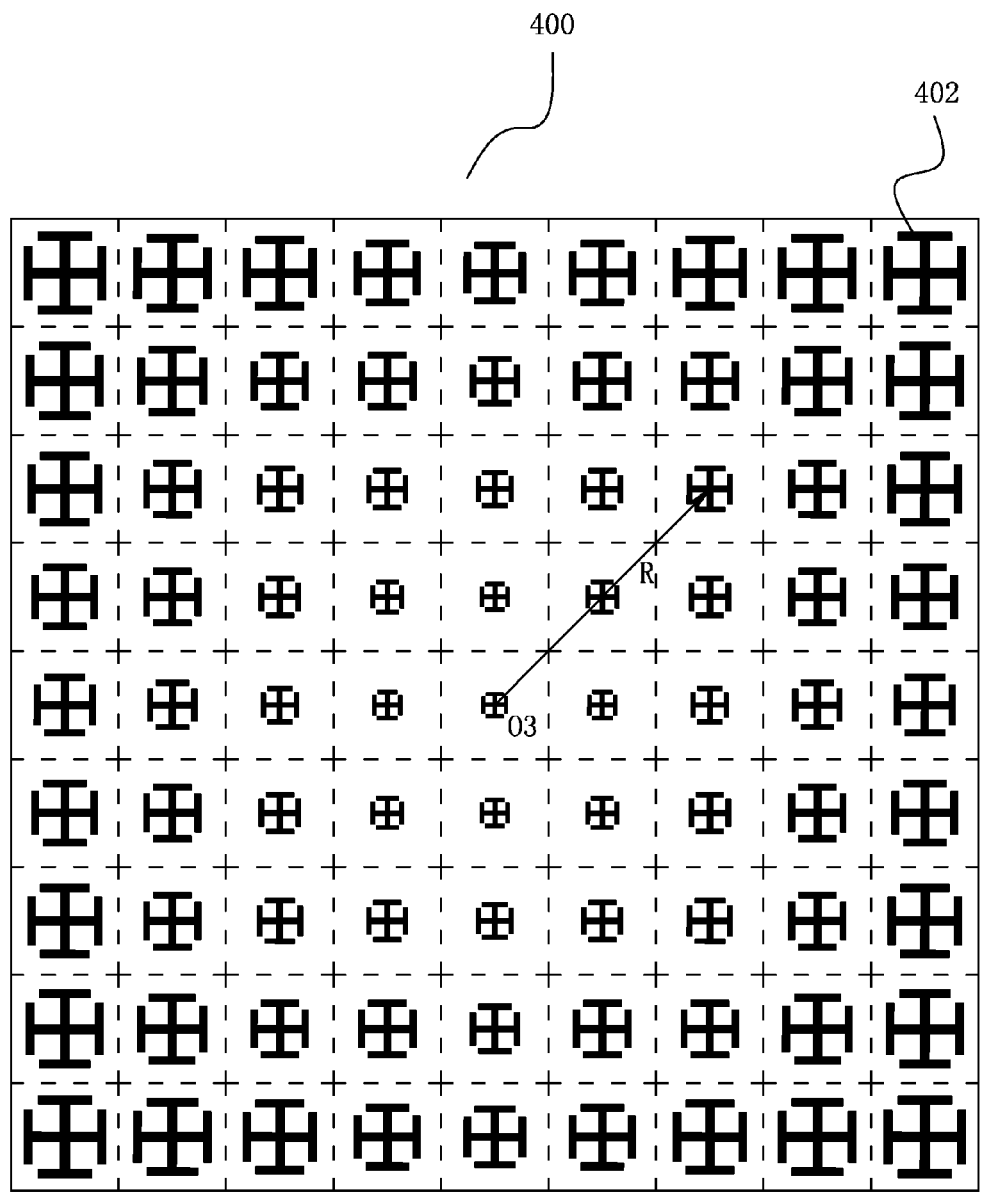
FIG. 11 is a front view after a substrate in FIG. 10 is removed.

FIG. 10 is a form of a diverging sheet 400 for realizing the refractive index distribution shown in FIG. 9. As shown in FIG. 10 and FIG. 11, the diverging sheet 400 comprises a sheet-like substrate 401, metal microstructures 402 attached on the substrate 401, and a supporting layer 403 covering the metal microstructures 402. The diverging sheet 400 may be divided into a plurality of identical first diverging units 404. Each first diverging unit comprises a metal microstructure 402, a substrate unit 405 on which the metal microstructure 402 is arranged, and a supporting layer unit 406. Each diverging sheet 400 has only one first diverging unit 404 in the thickness direction. All the first diverging units 404 may be identical blocks, such as cubes or cuboids. A length, a width, a height and a volume of each first diverging unit 404 are no larger than ⅕ of a wavelength of an incident electromagnetic wave (usually are 1/10 of the wavelength of the incident electromagnetic wave), so that the entire diverging sheet may have a continuous electric field and/or magnetic field response to the electromagnetic wave. Preferably, the first diverging unit 404 is a cube with a side length of 1/10 of the wavelength of the incident electromagnetic wave. Preferably, a structural form of the first diverging unit 404 of the present invention is the same as that of the metamaterial unit D shown in FIG. 2.

FIG. 11 is a front view after a substrate in FIG. 10 is removed. The spatial arrangement of the plurality of metal microstructures 402 can be clearly seen from FIG. 11. A center O3 of the diverging sheet 400 is taken as the circle center (the O3 herein is at the midpoint of the middlemost metal microstructure). Metal microstructures 402 at the same radius have the same geometrical sizes, and the geometrical sizes of the metal microstructures 402 gradually decrease with the increase of the radius. The radius herein refers to a distance from a center of each metal microstructure 402 to the center O3 of the diverging sheet 400.

The substrate 401 of the diverging sheet 400 is made from a ceramic material, a polymer material, a ferroelectric material, a ferrite material, or a ferromagnetic material. The macromolecular material may be selected from polytetrafluoroethylene, epoxy resin, F4B composite material, or FR-4 composite material. For example, polytetrafluoroethylene will not interfere with the electric field of the electromagnetic waves because of a good electrical insulating property thereof, and has excellent chemical stability and corrosion resistance and a long service life.

The metal microstructure 402 may be a metal wire such as copper wire or silver wire. The metal wire may be attached on the substrate by etching, electroplating, diamond etching, photoetching, electro-etching, or ion etching. Certainly, three-dimensional laser machining process may also be adopted. The metal microstructure 402 may adopt the metal microstructure in a shape of planar snowflake shown in FIG. 11. Certainly, the metal microstructure 402 may also be a derived structure of the metal microstructure in the shape of planar snowflake, or may be a metal wire of "I" shape and cross shape.

Figure 7:
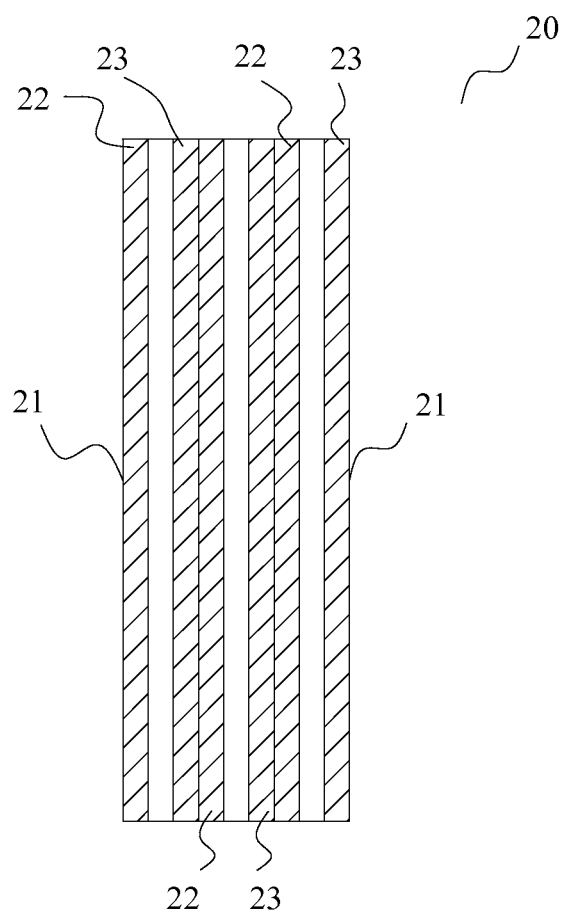
FIG. 7 is a schematic structural view of a matching layer according to the first embodiment of the present invention.
Figure 8:
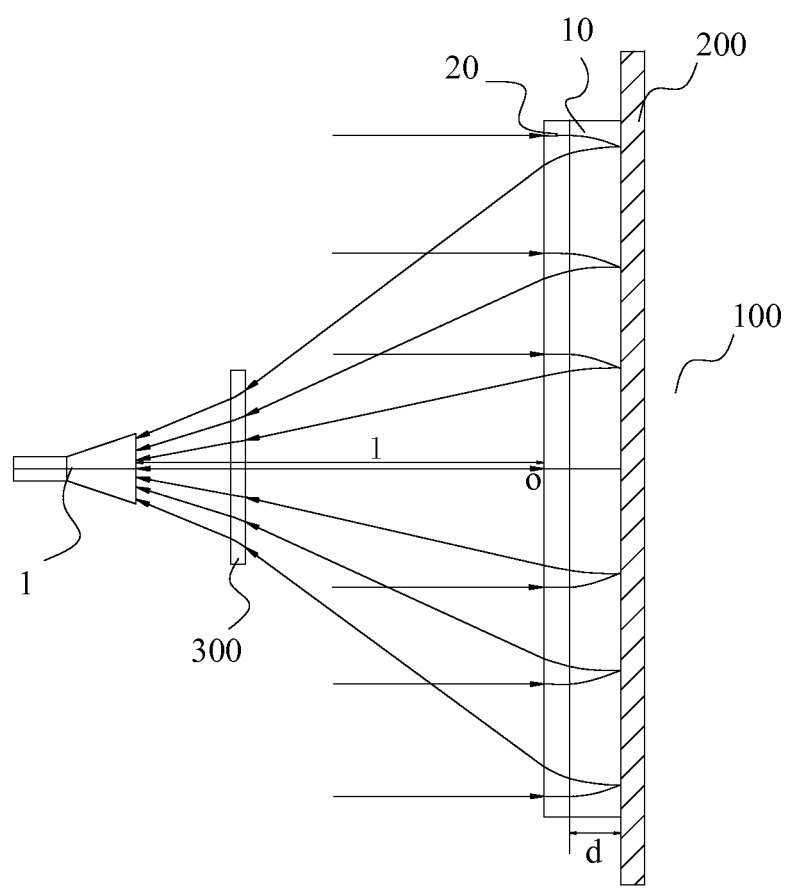
FIG. 8 is a schematic structural view of a front-feed satellite television antenna according to a second embodiment of the present invention.

FIG. 12 is a diverging metamaterial panel 300 formed by a plurality of diverging sheets 400 shown in FIG. 10. There are three sheets in the figure. Certainly, based on different requirements, the diverging metamaterial panel 300 may be formed by the diverging sheets 400 with another layer number. The plurality of diverging sheets 400 fit closely, and a double faced adhesive tape may be used to bond each other, or bolts may be used for fixed connection. In addition, the matching layer shown in FIG. 7 is further arranged at both sides of the diverging metamaterial panel 300 shown in FIG. 12, to match the refractive indices, reduce reflection of the electromagnetic wave, and enhance signal receiving.

Figure 13:
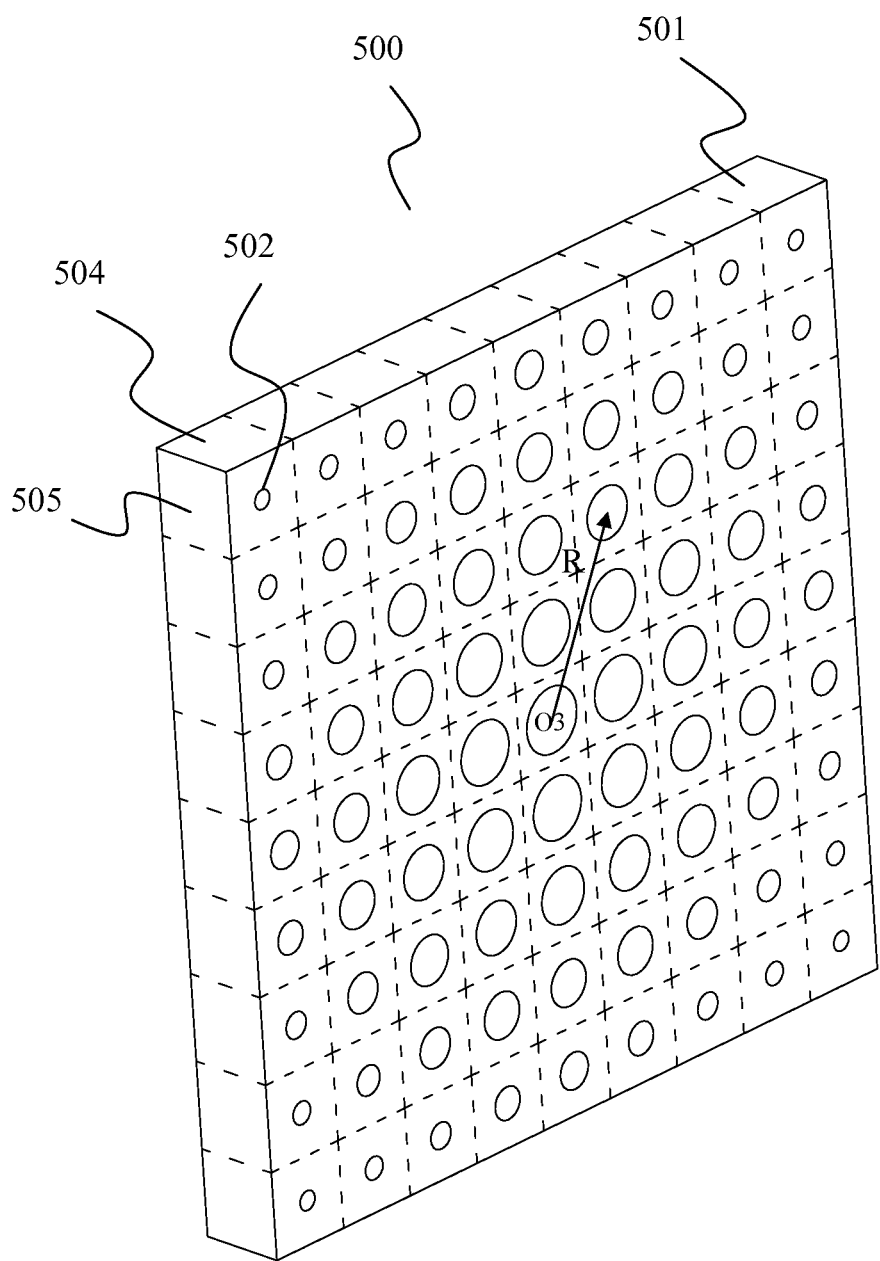
FIG. 13 is a schematic structural view of another form of a diverging sheet according to the second embodiment of the present invention.

FIG. 13 is another form of a diverging sheet 500 for achieving the refractive index distribution shown in FIG. 9. The diverging sheet 500 comprises a sheet-like substrate 501 and artificial holes 502 arranged on the substrate 501. The diverging sheet 500 may be divided into a plurality of identical second diverging units 504. Each second diverging unit 504 comprises an artificial hole 502 and a substrate unit 505 on which the artificial hole 502 is arranged. Each diverging sheet 500 has only one second diverging unit 504 in the direction of thickness. All the second diverging units 504 may be identical blocks, such as cubes or cuboids. A length, a width, a height and a volume of each second diverging unit 504 are no larger than ⅕ of a wavelength of an incident electromagnetic wave (usually are 1/10 of the wavelength of the incident electromagnetic wave), so that the entire diverging sheet may have a continuous electric field and/or magnetic field response to the electromagnetic wave. Preferably, the second diverging unit 504 is a cube with a side length of 1/10 of the wavelength of the incident electromagnetic wave.

As shown in FIG. 13, all the artificial holes on the diverging sheet 500 are cylindrical. A center O3 of the diverging sheet 500 is taken as the circle center (the O3 herein is on the central axis of the middlemost artificial hole). Artificial holes 502 at the same radius have the same volume, and volumes of the artificial holes 502 gradually decrease with the increase of the radius. The radius herein refers to a vertical distance from a central axis of each artificial hole 502 to the central axis of the middlemost artificial hole of the diverging sheet 500. Therefore, when each cylindrical hole is filled with a medium material with a refractive index less than that of the substrate (for example, air), the refractive index distribution shown in FIG. 9 can be realized. Certainly, if the center O3 of the diverging sheet 500 is taken as the circle center, the artificial holes 502 at the same radius have the same volume, and the volumes of the artificial holes 502 gradually increase with the increase of the radius, it is necessary to fill each cylindrical hole with a medium material with a refractive index greater than that of the substrate, thus the refractive index distribution shown in FIG. 9 can be realized.

Certainly, the diverging sheet is not limited to the above form. For example, each artificial hole may be divided into several unit holes with the same volume, and the same purpose may be achieved by controlling the volume of the artificial hole on each metamaterial unit D by controlling the number of unit holes on each substrate unit V. For another example, the diverging sheet may in the following form that, volumes of all the artificial holes of an identical diverging sheet are the same, but refractive indices of the filled medium thereof have a distribution same as that is shown in FIG. 9. That is, refractive indices of the filled medium materials at the same radius are the same, and the refractive indices of the filled medium materials gradually decrease with the increase of the radius.

The substrate 501 of the diverging sheet 500 is made from a ceramic material, a polymer material, a ferroelectric material, a ferrite material, or a ferromagnetic material. The polymer material may be selected from polytetrafluoroethylene, epoxy resin, F4B composite material, FR-4 composite material etc. For example, polytetrafluoroethylene will not interfere with the electric field of the electromagnetic waves because of the good electrical insulating property, and has excellent chemical stability and corrosion resistance and a long service life.

The artificial holes 502 may be formed on the substrate in a manner of high-temperature sintering, injection molding, stamping, or numerically controlled punching. Certainly, for the substrates with different materials, the forming manner of the artificial holes may also be different. For example, when the ceramic material is selected as the substrate, the artificial holes are formed on the substrate preferably in a manner of high-temperature sintering. When the polymer material is selected as the substrate, for example, polytetrafluoroethylene and epoxy resin, the artificial holes are formed on the substrate preferably in a manner of injection molding or stamping.

The above artificial hole 502 may be one of or a combination of cylindrical hole, conical hole, truncated conical hole, trapezoidal hole, or square hole. Certainly, the artificial hole may also be other shapes. The shape of the artificial hole on each second diverging unit may be same or different depending on different requirements. Certainly, for ease of processing and manufacturing, the entire metamaterial preferably adopts holes with the same shape.

FIG. 14 is a diverging metamaterial panel 300 formed by a plurality of diverging sheets 500 shown in FIG. 13. There are three sheets in the figure. Certainly, based on different requirements, the diverging metamaterial panel 300 may be formed by diverging sheets 500 with another layer number. The plurality of diverging sheets 500 fit closely, and a double faced adhesive tape may be used to bond each other, or bolts may be used for fixed connection. In addition, the matching layer shown in FIG. 7 is further arranged at both sides of the diverging metamaterial panel 300 shown in FIG. 14, to match the refractive indices, reduce reflection of the electromagnetic wave, and enhance signal receiving.

In addition, the present invention further provides a satellite television receiving system comprising a feed source, a low noise block, and a satellite receiver. The satellite television receiving system further comprises the above front-feed satellite television antenna. The front-feed satellite television antenna is arranged behind the feed source.

The feed source, low noise block, and satellite receiver are all prior arts, and will not be described herein again.

The embodiments of the present invention have been described with reference to the attached drawings; however, the present invention is not limited to the aforesaid embodiments, and these embodiments are merely illustrative but are not intended to limit the present invention. Persons of ordinary skill in the art may further derive many other implementations according to the teachings of the present invention and within the scope defined in the claims, and all of the implementations shall fall within the scope of the present invention.

What is claimed is:

1. A front-feed satellite television antenna, wherein the front-feed satellite television antenna comprises a metamaterial panel arranged behind a feed source; the metamaterial panel comprising a core layer, a reflective plate arranged at a surface of the core layer and a matching layer arranged on the other side of the core layer, to match refractive indices from air to the core layer; the core layer comprising at least one core layer sheet; the core layer sheet comprising a sheet-like substrate and a plurality of artificial microstructures or holes arranged on the substrate; based on refractive index distribution, the core layer sheet being divided into a circular area in a middle position and a plurality of annular areas, which are distributed around the circular area and share a circle center with the circular area; refractive indices at a same radius in the circular area and annular areas being the same, and refractive indices in respective areas of the circular area and annular areas gradually decreasing with the increase of a radius; a minimum refractive index value in the circular area being smaller than a maximum refractive index value in the adjacent annular area; and with respect to two adjacent annular areas, a minimum refractive index value in an annular area on the inner side being smaller than a maximum refractive index value in an annular area on the outer side, wherein the circle center is a center of the core layer sheet, refractive index variation ranges of the circular area and the plurality of annular areas are the same, and distribution of a refractive index n(r) of the core layer sheet meets the following formula:

$$n(r) = n_{max} - \frac{\sqrt{l^2 + r^2} - l - k\lambda}{2d};$$

wherein n(r) represents a refractive index value at a radius r on the core layer sheet;

l is a distance from the feed source to the matching layer adjacent to the feed source, or l is a distance from the feed source to the core layer;

d is a thickness of the core layer, and $$d = \frac{\lambda}{2(n_{max} - n_{min})};$$

$n_{max}$ represents a maximum refractive index value of the core layer sheet;

$n_{min}$ represents a minimum refractive index value of the core layer sheet; and $$k = \text{floor}\left(\frac{\sqrt{l^2 + r^2} - l}{\lambda}\right),$$

wherein floor represents rounding down to an integer, wherein the matching layer comprises a plurality of matching layer sheets, and each matching layer sheet has a single refractive index, all refractive indices of the plurality of matching layer sheets of the matching layer satisfy the following formula:

$$n(i) = ((n_{max} + n_{min})/2)^{\frac{i}{m}};$$

wherein m represents the total number of matching layers, and i represents a serial number of the matching layer sheet, wherein a serial number of the matching layer sheet adjacent to the core layer is m.

2. The front-feed satellite television antenna according to claim 1, wherein the core layer sheet further comprises a fill layer covering the artificial microstructures.

3. The front-feed satellite television antenna according to claim 2, wherein the core layer comprises a plurality of parallel core layer sheets with the same refractive index distribution.

4. The front-feed satellite television antenna according to claim 2, wherein a plurality of artificial microstructures of each core layer sheet of the core layer are the same in shape, a plurality of artificial microstructures at a same radius in the circular area and the annular areas have the same geometrical sizes, and geometrical sizes of the artificial microstructures in respective areas of the circular area and annular areas gradually decrease with the increase of the radius; geometrical sizes of the artificial microstructure with minimum geometrical sizes in the circular area are smaller than geometrical sizes of the artificial microstructure with maximum geometrical sizes in the adjacent annular area; and with respect to two adjacent annular areas, geometrical sizes of the artificial microstructure with minimum geometrical sizes in an annular area on the inner side are smaller than geometrical sizes of the artificial microstructure with maximum geometrical sizes in an annular area on the outer side.

5. A satellite television receiving system, comprising a feed source, a low noise block, and a satellite receiver, wherein the satellite television receiving system further comprises a front-feed satellite television antenna according to claim 1.

6. The front-feed satellite television antenna according to claim 1, wherein the artificial hole is cylindrical.

7. The front-feed satellite television antenna according to claim 1, wherein each of the matching layer sheets comprises a first substrate and a second substrate with the same material, and air is filled between the first substrate and the second substrate.

8. The front-feed satellite television antenna according to claim 1, wherein the artificial microstructure is a metal microstructure in a shape of planar snowflake.

9. The front-feed satellite television antenna according to claim 1, wherein a plurality of artificial holes of each core layer sheet of the core layer are the same in shape, and the plurality of artificial holes are filled with a medium with a refractive index less than that of the substrate; a plurality of artificial holes at the same radius in the circular area and the annular areas have a same volume, and the volumes of the artificial holes in respective areas of the circular area and annular areas gradually decrease with the increase of the radius; a volume of the artificial hole with the minimum volume in the circular area is less than a volume of the artificial hole with the maximum volume in the adjacent annular area; and with respect to two adjacent annular areas, a volume of the artificial hole with the minimum volume in an annular area on the inner side is less than a volume of the artificial hole with the maximum volume in an annular area on the outer side.

10. The front-feed satellite television antenna according to claim 1, wherein a plurality of artificial holes of each core layer sheet of the core layer are the same in shape, and the plurality of artificial holes are filled with a medium with a refractive index less than that of the substrate; a plurality of artificial holes at a same radius in the circular area and the annular areas have a same volume, and volumes of the artificial holes in respective areas of the circular area and annular areas gradually increase with the increase of the radius; a volume of the artificial hole with the maximum volume in the circular area is greater than a volume of the artificial hole with the minimum volume in the adjacent annular area; and with respect to two adjacent annular areas, a volume of the artificial hole with the maximum volume in an annular area on the inner side is greater than a volume of the artificial hole with the minimum volume in an annular area on the outer side.

11. The front-feed satellite television antenna according to claim 1, further comprising a diverging element, which is arranged behind the feed source and has an electromagnetic wave diverging function, and the metamaterial panel is arranged behind the diverging element.

12. The front-feed satellite television antenna according to claim 11, wherein the diverging element is a concave lens.

13. The front-feed satellite television antenna according to claim 11, wherein the diverging element is a diverging metamaterial panel, and the diverging metamaterial panel comprises at least one diverging sheet; refractive indices of the diverging sheet are distributed in a form of circle with a circle center defined by a center of the diverging sheet, refractive indices at a same radius are the same, and refractive indices gradually decrease with the increase of the radius.

* * * * *